United States Patent
Miller et al.

(10) Patent No.: US 9,897,812 B2
(45) Date of Patent: Feb. 20, 2018

(54) STRAP SYSTEM FOR VIRTUAL REALITY HEAD-MOUNTED DISPLAY

(71) Applicant: Oculus VR, LLC., Menlo Park, CA (US)

(72) Inventors: Robin Michael Miller, Redmond, WA (US); Joseph Patrick Sullivan, Issaquah, WA (US); Jared Drinkwater, Auburn, WA (US)

(73) Assignee: Oculus VR, LLC., Menlo Park, CA (US)

( * ) Notice: Subject to any disclaimer, the term of this patent is extended or adjusted under 35 U.S.C. 154(b) by 455 days.

(21) Appl. No.: 14/603,335

(22) Filed: Jan. 22, 2015

(65) Prior Publication Data
US 2016/0216512 A1    Jul. 28, 2016

(51) Int. Cl.
*G02B 27/01* (2006.01)
*A42B 1/24* (2006.01)

(52) U.S. Cl.
CPC .......... *G02B 27/0176* (2013.01); *A42B 1/245* (2013.01); *A42B 1/24* (2013.01)

(58) Field of Classification Search
CPC ........... A42B 1/24; A42B 1/245; A42B 1/242; A42B 1/244; A42B 3/14; A42B 3/142; A42B 3/145; A42B 3/147; A41D 20/00; A41F 9/02; A42C 5/02; G02B 27/0176; G02B 27/017; G06F 1/163; G06F 1/1637; G06F 1/1654; A61M 16/0683; A61M 16/0694; A62B 18/084
USPC ....................................... 2/DIG. 11; 224/181
See application file for complete search history.

(56) References Cited

U.S. PATENT DOCUMENTS

| | | | | |
|---|---|---|---|---|
| 5,003,300 A | * | 3/1991 | Wells | G02B 13/16 340/980 |
| 5,321,416 A | * | 6/1994 | Bassett | A42B 3/145 345/8 |
| 7,484,646 B1 | * | 2/2009 | Holmes | B63C 11/12 2/422 |
| 2006/0196511 A1 | * | 9/2006 | Lau | A61M 16/0666 128/207.11 |
| 2010/0327028 A1 | * | 12/2010 | Nakabayashi | A42B 1/247 224/162 |
| 2011/0090135 A1 | * | 4/2011 | Tricoukes | G02B 27/0176 345/8 |
| 2011/0127305 A1 | * | 6/2011 | Yates | G02B 7/002 224/181 |

(Continued)

*Primary Examiner* — Amy Vanatta
(74) *Attorney, Agent, or Firm* — Morgan, Lewis & Bockius LLP

(57) ABSTRACT

A strap system and a method for wearing the strap system are disclosed. The strap system includes a first flexible segment comprising a first stretchable band; a first semi-rigid segment to conform to a portion of the user's head and comprising a first arc portion to extend from above a user's first ear to below the user's occipital lobe; and a first rigid guide segment connected to the first flexible segment and the first semi-rigid segment. The first flexible segment extends beyond a first end of the first rigid guide segment and the first semi-rigid segment extends from a second end of the first rigid guide segment, the first and second ends of the first rigid guide segment being opposite to each other in a lateral dimension. The first flexible segment is stretchable within the first rigid guide segment along the lateral dimension.

15 Claims, 15 Drawing Sheets

(56) References Cited

U.S. PATENT DOCUMENTS

| | | | |
|---|---|---|---|
| 2011/0197341 A1* | 8/2011 | Formica | A61M 16/0683 2/209.3 |
| 2012/0280007 A1* | 11/2012 | Nakabayashi | G02B 27/0176 224/181 |
| 2013/0199537 A1* | 8/2013 | Formica | A61M 16/06 128/205.25 |
| 2015/0246198 A1* | 9/2015 | Bearne | A61M 16/0683 128/205.25 |
| 2015/0328423 A1* | 11/2015 | Siew | A61M 16/06 128/205.25 |
| 2016/0044981 A1* | 2/2016 | Frank | G02B 27/0176 2/422 |
| 2016/0054570 A1* | 2/2016 | Bosveld | A41D 20/00 2/209.3 |
| 2016/0054571 A1* | 2/2016 | Tazbaz | G02B 27/0176 359/630 |

* cited by examiner

800

802 — Position the head-mounted display on the user's head and in front of the user's eyes, with first and second rigid guide segments of the strap system connected to the head-mounted display and positioned along sides of the user's head above the user's ears.

804 — Position a rigid piece of the strap system on the back of the user's head.

806 — Semi-rigid arcs of the strap system extend from the first and second rigid guide segments above the user's ears to portions of the rigid piece below the user's occipital lobe.

808 — Extend a free end of a first flexible segment and a free end of a second flexible segment of the strap system and adjustably lock the first free end and the second free end onto the head-mounted display.

810 — The first flexible segment comprises a first stretchable band, the second flexible segment comprises a second stretchable band, and the first and second stretchable bands are respectively connected to the first and second rigid guide segments.

812 — Extend a first end of a top strap of the strap system through the head-mounted display. A second end of the top strap is connected to the rigid piece.

814 — Adjust and lock the top strap with respect to the head-mounted display, wherein the top strap conforms to the top of the user's head from the rigid piece to the head-mounted display.

Figure 8

STRAP SYSTEM FOR VIRTUAL REALITY HEAD-MOUNTED DISPLAY

TECHNICAL FIELD

This application relates generally to wearable technology and virtual reality technology, including but not limited to a virtual reality head-mounted display system.

BACKGROUND

Virtual reality head-mounted displays have wide applications in various fields, including engineering design, medical surgery practice, military simulated practice, and video gaming. For example, a user wears a virtual reality head-mounted display while playing video games so that the user can have a more interactive experience in a virtual environment.

These virtual reality head-mounted displays, however, may make it difficult for a user to properly adjust and comfortably wear the head-mounted displays using the existing systems, and thus negatively affect the user's experience.

SUMMARY

The embodiments of the present disclosure provide a strap system and a method for using the strap system to mount a head-mounted display on a user's head. In accordance with some embodiments, a strap system includes a first flexible segment comprising a first stretchable band; a first semi-rigid segment to conform to a portion of the user's head, the first semi-rigid segment comprising a first arc portion to extend from above a user's first ear to below the user's occipital lobe; and a first rigid guide segment connected to the first flexible segment and the first semi-rigid segment. In some embodiments, the first flexible segment extends beyond a first end of the first rigid guide segment and the first semi-rigid segment extends from a second end of the first rigid guide segment, the first and second ends of the first rigid guide segment being opposite to each other in a lateral dimension. In some embodiments, the first flexible segment is stretchable within the first rigid guide segment along the lateral dimension so as to adjust the strap system in accordance with the user's head.

In accordance with some embodiments, a method for using a strap system to mount a head-mounted display on a user's head includes: positioning the head-mounted display on the user's head and in front of the user's eyes, wherein first and second rigid guide segments of the strap system are connected to the head-mounted display and are positioned along sides of the user's head above the user's ears; positioning a rigid piece of the strap system on the back of the user's head; and extending a free end of a first flexible segment and a free end of a second flexible segment of the strap system and adjustably locking the first free end and the second free end onto the head-mounted display. In some embodiments, the first flexible segment comprises a first stretchable band, the second flexible segment comprises a second stretchable band, and the first and second stretchable bands are respectively connected to the first and second rigid guide segments. In some embodiments, semi-rigid arcs extend from the first and second rigid guide segments above the user's ears to portions of the rigid piece below the user's occipital lobe.

In accordance with some embodiments, a head-mounted display system includes a head-mounted display and a strap system coupled to the head-mounted display. The strap system comprises: first and second flexible segments; first and second rigid guide segments connected to the first and second flexible segments respectively, the first and second rigid guide segments further connected to the head-mounted display; and at least one semi-rigid segment, connected to the first and second rigid guide segment, to conform to a portion of the user's head, the at least one semi-rigid segment comprising arc portions to extend from above a user's ears to below the user's occipital lobe.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIG. 8 is a flowchart illustrating a method for using a strap system to mount a head-mounted display on a user's head.

Like reference numerals refer to corresponding parts throughout the several views of the drawings.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
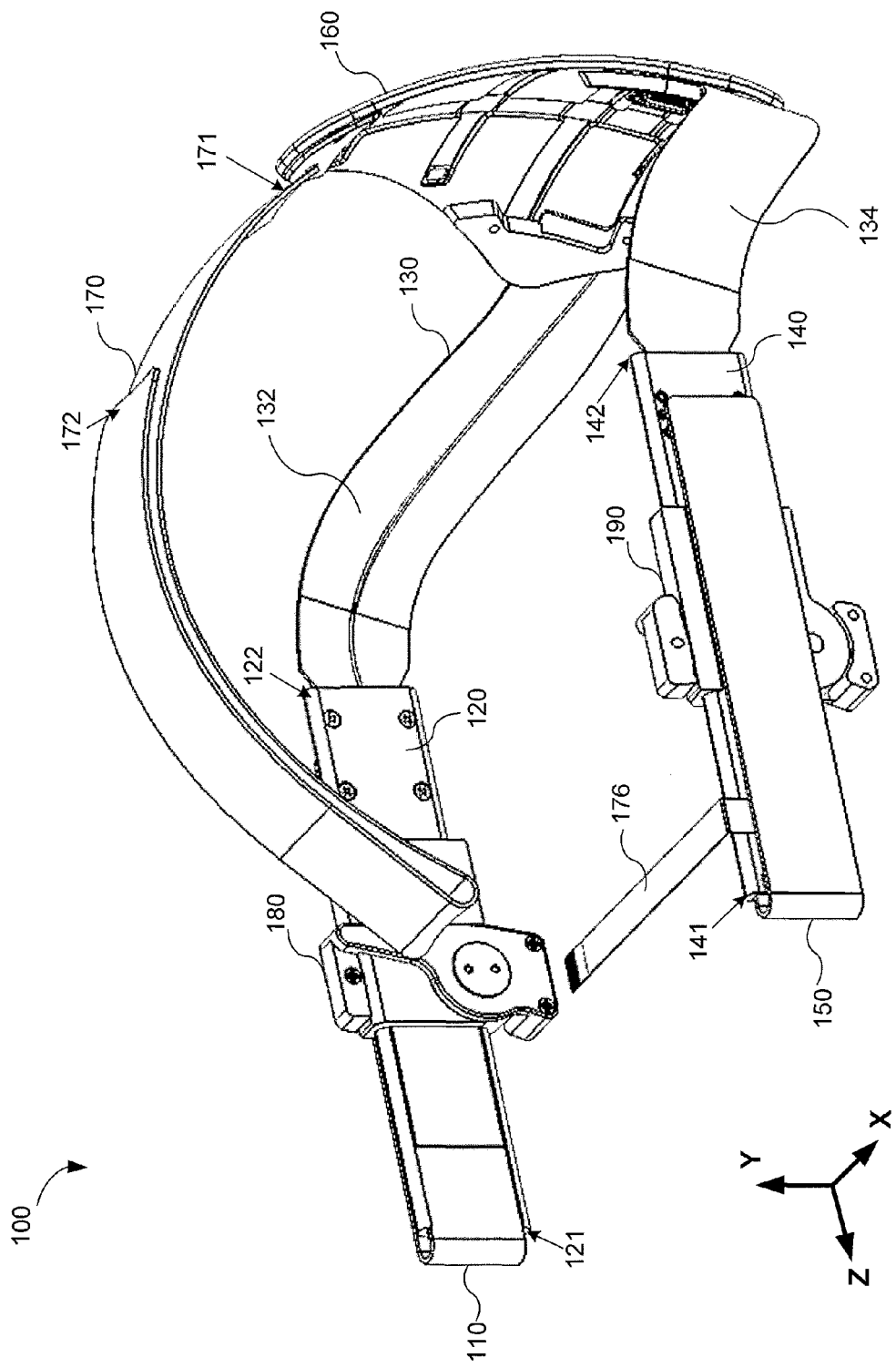
FIG. 1A is a perspective view of a strap system for a head-mounted display in accordance with some embodiments.
Figure 1B:
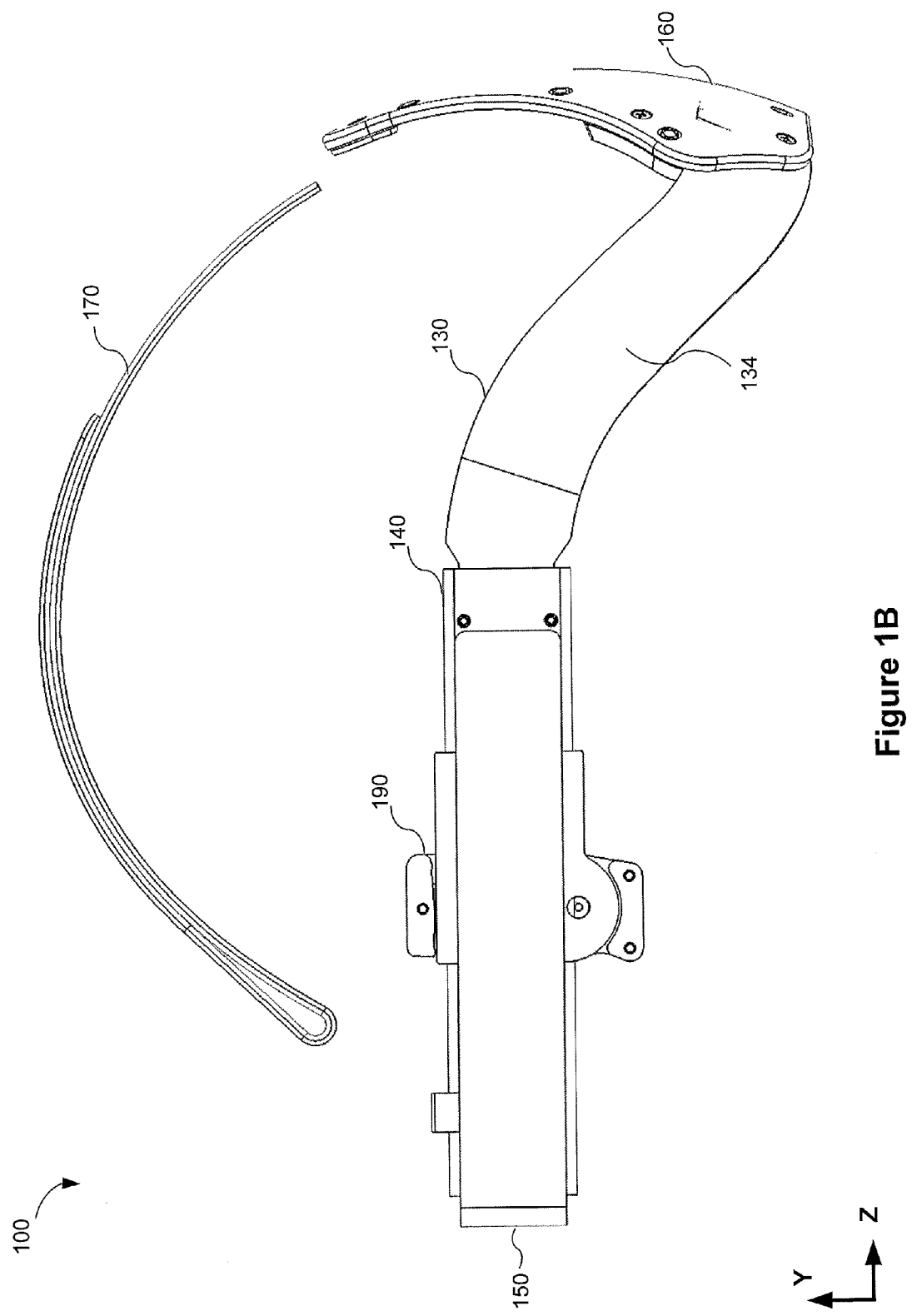
FIG. 1B is a side view of a strap system for a head-mounted display in accordance with some embodiments.
Figure 1C:
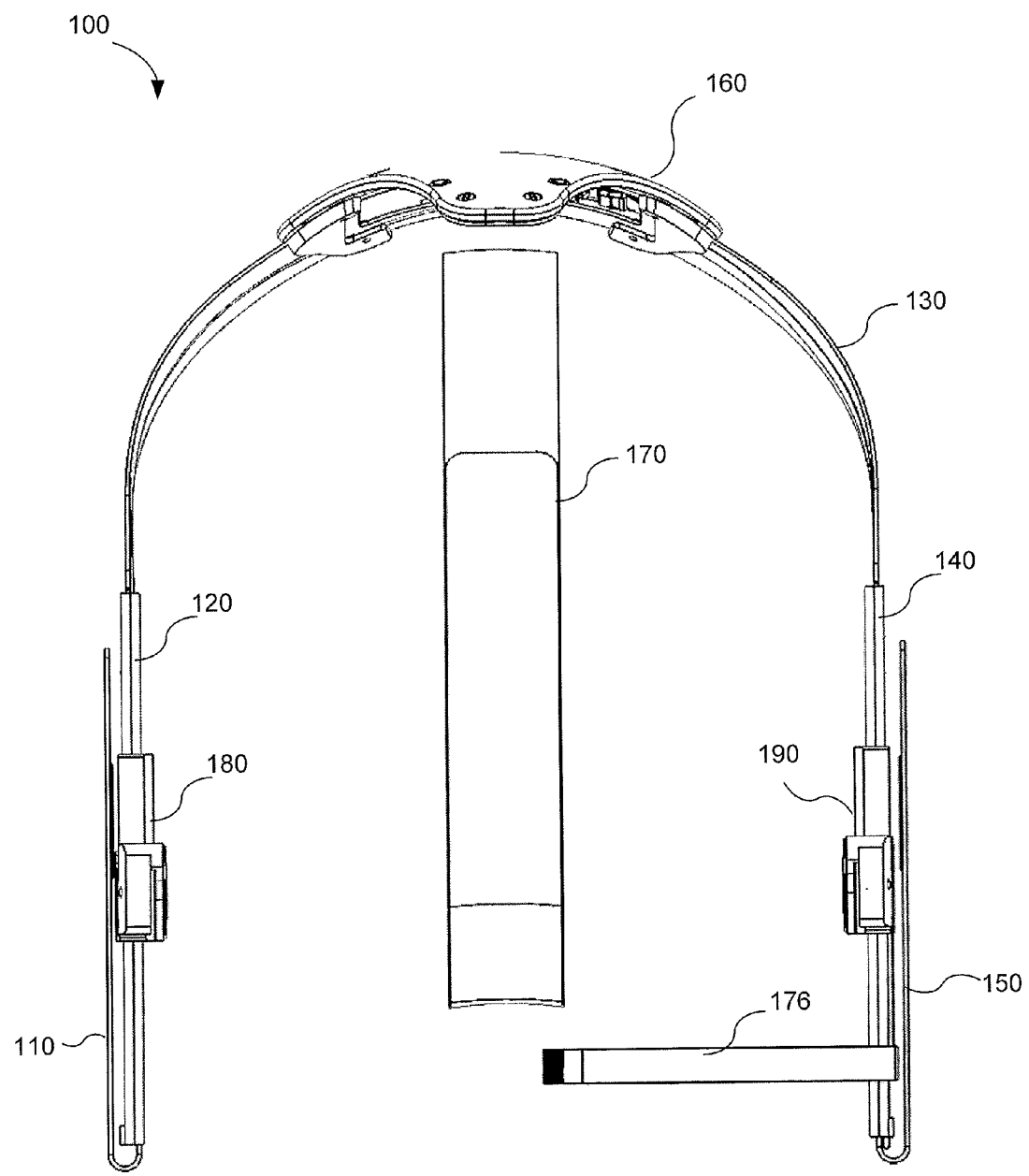
FIG. 1C is a top view of a strap system for a head-mounted display in accordance with some embodiments.
Figure 1D:
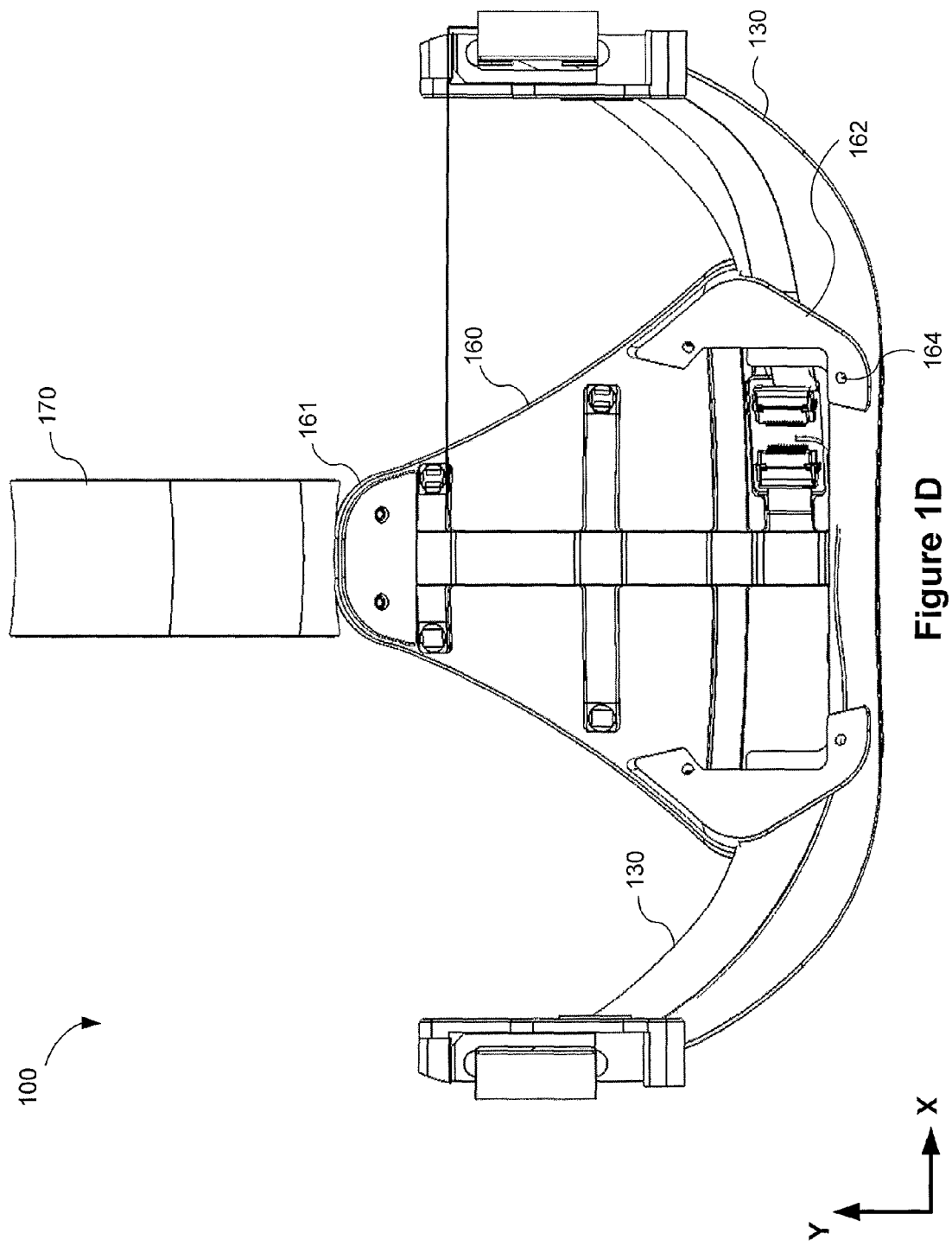
FIG. 1D is a front view of a strap system for a head-mounted display in accordance with some embodiments.

FIG. 1A is a perspective view of a strap system 100 for a head-mounted display in accordance with some embodiments. FIGS. 1B-1D are a side view, a top view, and a front view respectively of the strap system 100 for a head-mounted display in accordance with some embodiments. The strap system 100 is used for mounting a head-mounted display (e.g., head-mounted display 710 in FIGS. 7A-7C) on a user's head. For example, the strap system 100 can be coupled with a virtual reality head-mounted display and used to mount the virtual reality head-mounted display on the user's head, so that the user can wear the virtual reality head-mounted display while playing video games.

As shown in FIG. 1C, the strap system 100 comprises a flexible segment 110, a rigid guide segment 120, a semi-rigid segment 130, a rigid guide segment 140, and a flexible segment 150 that are coupled to each other to adjustably wrap around side and back portions of the user's head. The flexible segment 110, the rigid guide segment 120, the rigid guide segment 140, and the flexible segment 150 extend along a lateral dimension (e.g., Z dimension). The semi-rigid segment 130 extends from above the user's ears to below the user's occipital lobe. In some embodiments, a length of the strap system 100 that wraps around side and back portions of the user's head is in a range from about 440 mm to about 530 mm. In some embodiments, the circumference of the strap system 100 coupled with the head-mounted display (e.g., the head-mounted display 710 of FIGS. 7A-7C) is in a range from about 540 mm to about 630 mm.

In some embodiments, the strap system 100 also comprises a rigid piece 160 which can be coupled with the semi-rigid segment 130 to rest against the back of the user's head (e.g., around the user's occipital lobe). In some embodiments, the strap system 100 includes a top strap 170 coupled to the rigid piece 160 and the head-mounted display to adjustably conform to the top of the user's head when the user is wearing the head-mounted display. In some embodiments, the strap system 100 includes flat flexible circuits 176 attached to the semi-rigid segment 130, the rigid guide segment 140, and/or the rigid piece 160 to provide power management. In some embodiments, mounting devices 180 and 190 are attached to the rigid guide segments 120 and 140 respectively, to connect the strap system 100 to a head-mounted display.

Figure 2:
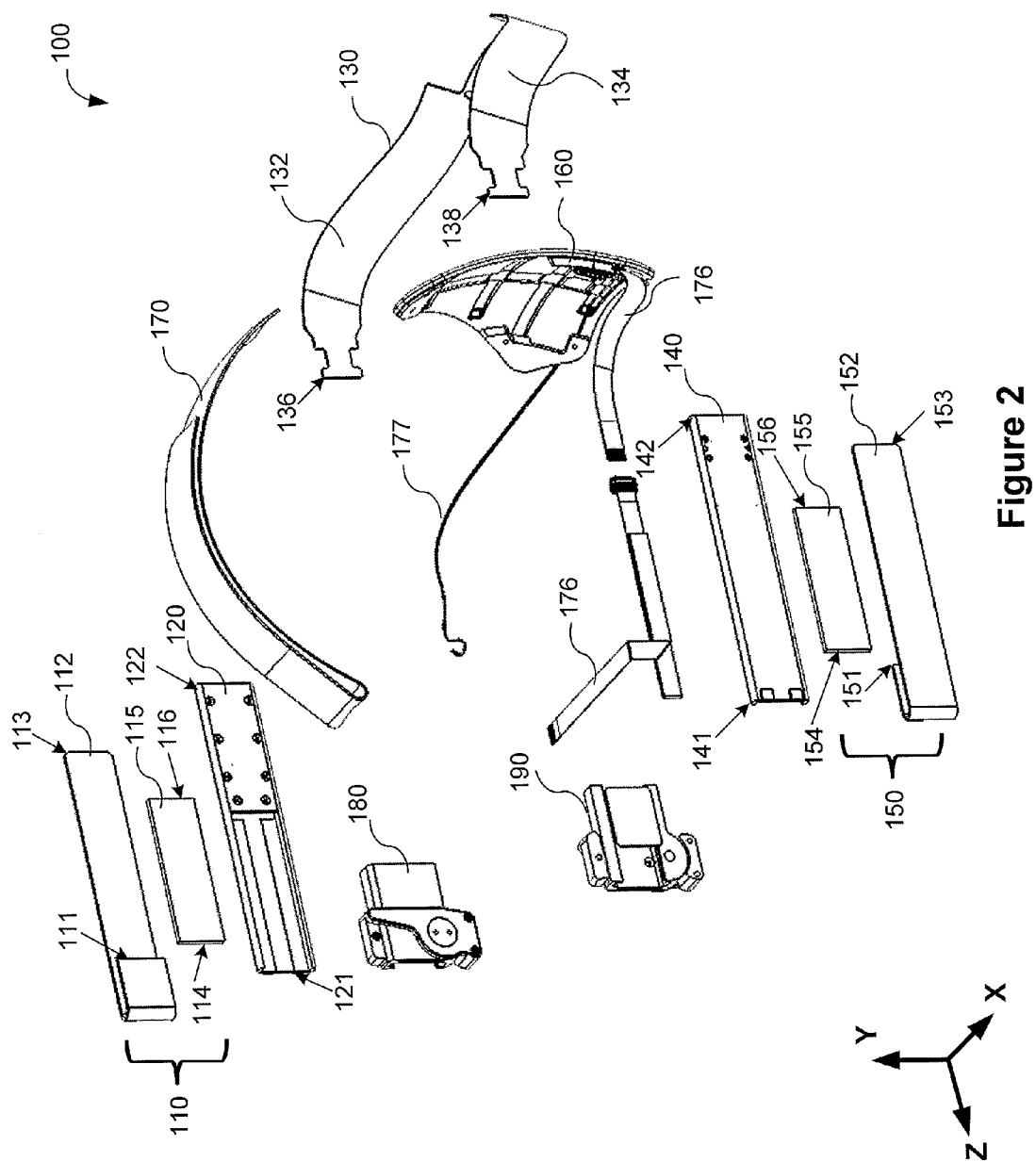
FIG. 2 is a perspective view of a plurality of segments of a strap system for a head-mounted display in accordance with some embodiments.

FIG. 2 illustrates a plurality of segments of the strap system 100 as shown in FIGS. 1A-1D in accordance with some embodiments. As shown in FIG. 2, the flexible segment 110 comprises a stretchable band 115 and a non-stretchable band 112 that are connected with each other. Similarly, the flexible segment 150 comprises a stretchable band 155 and a non-stretchable band 152 that are connected with each other. In some embodiments, each of the stretchable band 115 and the stretchable band 155 are made of an elastic material, such as polyester woven elastic, or any other suitable elastic material. In some embodiments, each of the non-stretchable band 112 and the non-stretchable band 152 is made of a bendable, non-elastic material, such as polyurethane sheet or nylon webbing.

Figure 3:
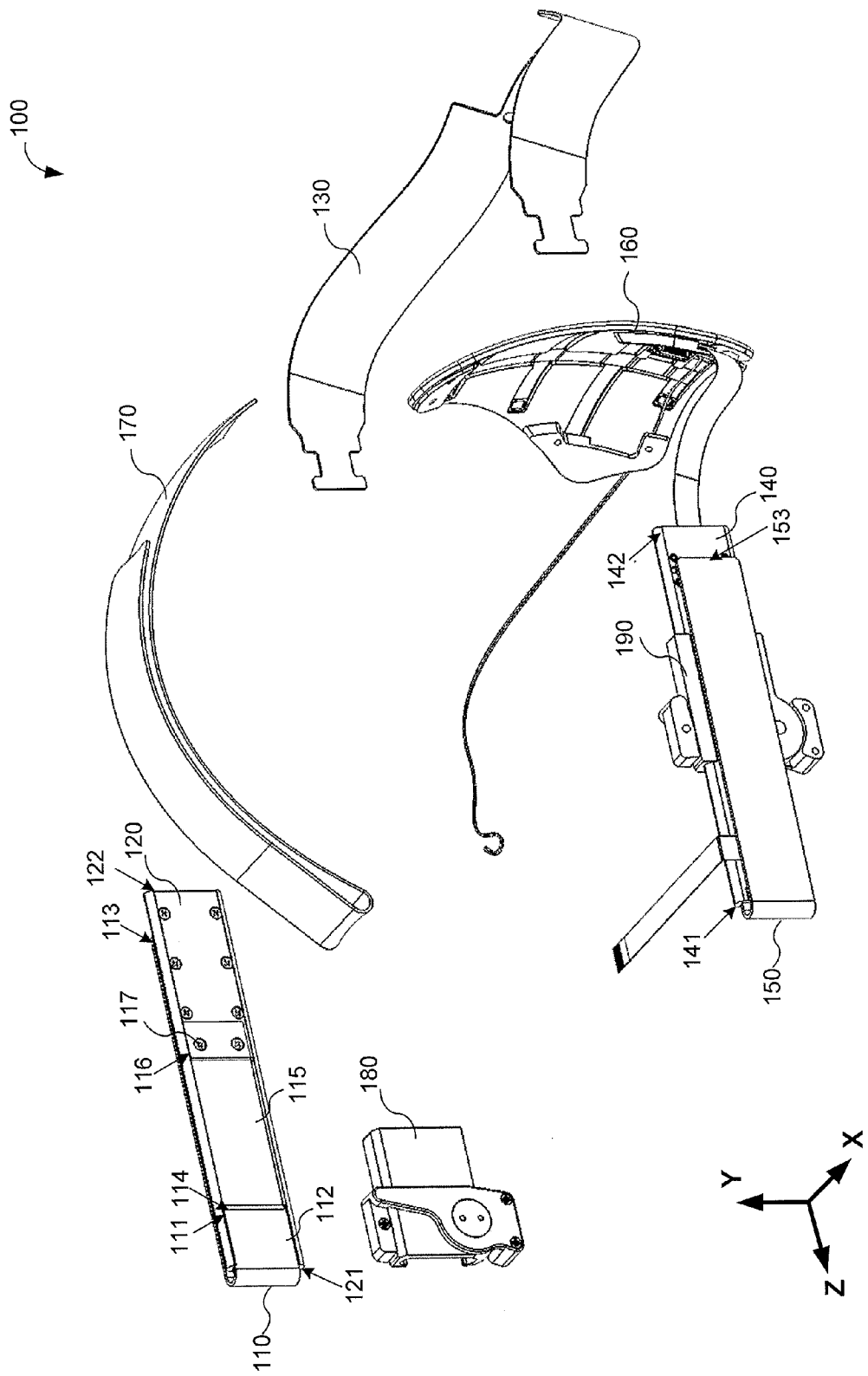
FIG. 3 is a perspective view of a plurality of segments of a strap system for a head-mounted display in accordance with some embodiments.

FIG. 3 also illustrates a plurality of segments of the strap system 100 as shown in FIGS. 1A-1D and 2 in accordance with some embodiments. As shown in FIG. 3, the stretchable band 115 and the non-stretchable band 112 of the flexible segment 110 are connected to each other. For example, an end 114 of the stretchable band 115 is connected to an end 111 (wrapped back) of the non-stretchable band 112 using a suitable method, such as stitching. Similarly, an end 154 (FIG. 2) of the stretchable band 155 is connected to an end 151 (wrapped back) of the non-stretchable band 152 using a suitable method, such as stitching.

As further shown in FIGS. 2-3, the flexible segment 110 can be attached to the rigid guide segment 120. In some embodiments, an end 116 of the stretchable band 115 is attached to a middle portion of the rigid guide segment 120. The end 116 can also be attached to another suitable position of the rigid guide segment 120. In some embodiments, the end 116 of the stretchable band 115 is screwed (117) to the rigid guide segment 120 as shown in FIG. 3. The stretchable band 115 can also be attached to the rigid guide segment 120 using another suitable method. After the flexible segment 110 is attached to the rigid guide segment 120, the flexible segment 110 extends beyond an end 121 of the rigid guide segment 120. The flexible segment 110 is stretchable within the rigid guide segment 120 along the lateral dimension (e.g., along Z dimension) so as to adjust the strap system 100 in accordance with the size and shape of the user's head. In some embodiments, after the strap system 100 is coupled with a head-mounted display, a free end 113 of the non-stretchable band 112 extends through a slit on one side of the head-mounted display and wraps back to lock the free end 113 on the head-mounted display to adjustably fit the head-mounted display on the user's head. The free end 113 can be locked on a side portion of the head-mounted display using any suitable method (e.g., hook-and-loop fasteners). For example, a fabric component with hooks and a fabric component with loops are attached (e.g., adhered, sewn) to the opposite surfaces of the free end 113 and the side portion of the head-mounted display respectively, so that the free end 113 can be attached to and locked on the side portion of the head-mounted display.

Similarly, the flexible segment 150 can be attached to the rigid guide segment 140. For example, an end 156 of the stretchable band 155 is screwed to a middle portion of the rigid guide segment 140. After the flexible segment 150 is attached to the rigid guide segment 140, the flexible segment 150 extends beyond an end 141 of the rigid guide segment 140. The flexible segment 150 is stretchable within the rigid guide segment 140 along the lateral dimension (e.g., along Z dimension) so as to adjust, in combination with the flexible segment 110, the strap system 100 to fit the strap system 100 around the user's head. In some embodiments, after the strap system 100 is coupled with a head-mounted display, a free end 153 of the non-stretchable band 152 extends through a slit on the other side of the head-mounted display and wraps back to lock the free end 153 on the other side of the head-mounted display using any suitable method (e.g., hook-and-loop fasteners).

Referring back to FIG. 1A, in some embodiments when the user is wearing a head-mounted display, the top strap 170 is coupled to both the rigid piece 160 and the head-mounted display and conforms to the top of the user's head. In some embodiments, a length of an arc portion of the top strap 170 that conforms to the top of the user's head is in a range from about 200 mm to about 360 mm. In some embodiments, one end 171 of the top strap 170 is attached to the rigid piece 160, and the other free end 172 of the top strap 170 is coupled to the head-mounted display to adjustably fit the head-mounted display on the user's head. For example, the free end 172 of the top strap 170 extends through a slit on the head-mounted display and wraps back to lock the free end 172 of the top strap 170 using a suitable method, such as hook-and-loop fasteners. When the head-mounted display is mounted on the user's head, the top strap 170 bears the load the head-mounted display from the front of the user's face. In some embodiments, the top strap 170 is non-stretchable and is made of bendable, non-elastic fabric material, such as polyurethane sheet or nylon webbing.

Figure 4A:
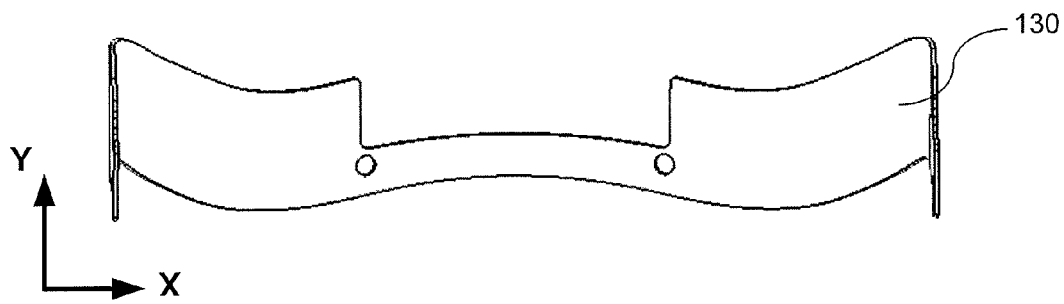
FIG. 4A is a front view of a semi-rigid segment of a strap system for a head-mounted display in accordance with some embodiments.

FIG. 4A is a front view of the semi-rigid segment 130 of the strap system 100. The semi-rigid segment 130 conforms to a portion of the user's head when the user is wearing the strap system 100. In some embodiments as illustrated in FIGS. 1A and 2, the semi-rigid segment 130 comprises an arc portion 132 to extend from above a user's right ear to below the user's occipital lobe. The semi-rigid segment 130 may also include an arc portion 134 to extend from above a user's left ear to below the user's occipital lobe. In some embodiments, the semi-rigid segment 130 is made of a semi-rigid plastic material, such as acrylonitrile butadiene styrene (ABS) plastic. The semi-rigid segment 130 has a degree of compliance to accommodate different users with different head sizes and shapes.

Figure 4B:
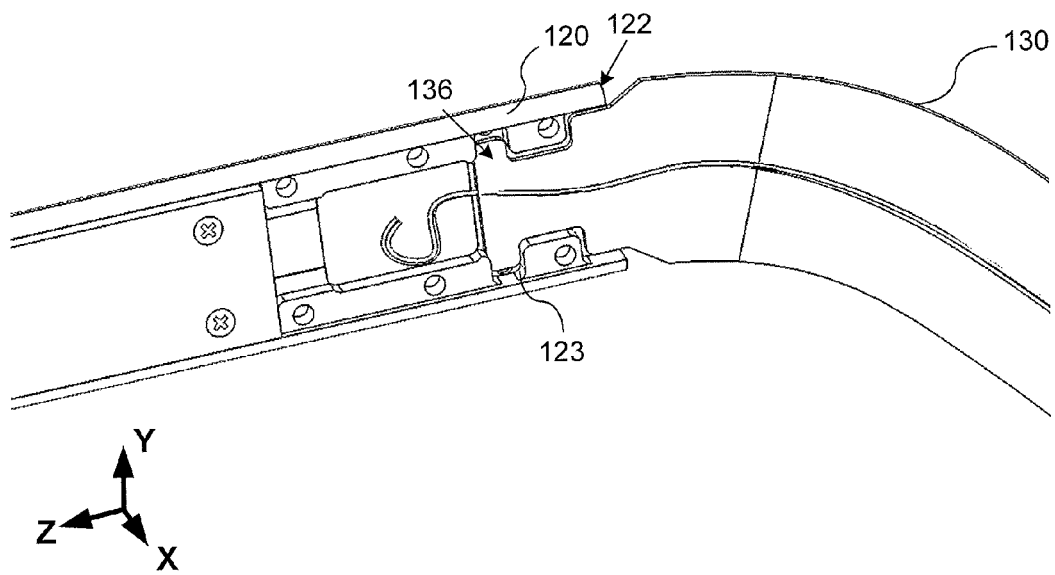
FIG. 4B is a view of a semi-rigid segment coupled to a rigid segment of a strap system for a head-mounted display in accordance with some embodiments.

FIG. 4B is a view of the semi-rigid segment 130 coupled to the rigid segment 120 of the strap system 100. In some embodiments, the semi-rigid segment 130 includes a protruding end 136 (e.g., a T-shaped part), and the rigid guide segment 120 includes matching grooves 123 for engaging the protruding end 136 in the grooves 123, such that the semi-rigid segment 130 can be clipped in the rigid guide segment 120 to connect the semi-rigid segment 130 to the rigid guide segment 120. The semi-rigid segment 130 can also be attached to the rigid guide segment 120 using any other suitable method, such as stitching or screwing. Similarly as shown in FIG. 2, the semi-rigid segment 130 may also include an end 138 to couple to the rigid guide segment 140 using any suitable methods.

The semi-rigid segment 130 is further coupled to the rigid piece 160. In some embodiments as shown in FIG. 1D, the semi-rigid segment 130 passes through slots (e.g., slots 162) and is further screwed (164) on the inner surface of the rigid piece 160. The semi-rigid segment 130 can also be attached to the rigid piece 160 using any other suitable methods.

In some embodiments as discussed above, the semi-rigid segment 130 of the strap system 100 is a single and continuous piece as shown in FIG. 4A. After the semi-rigid segment 130 is coupled to the rigid guide segments 120 and 140, the semi-rigid segment 130 extends from an end 122 of the rigid guide segment 120 to an end 142 of the rigid guide segment 140 to wrap around the side and back portions of the user's head. The end 122 is opposite to the end 121 of the rigid guide segment 120 along the Z-axis (i.e., in a lateral direction). Likewise, the end 142 is opposite to the end 141 of the rigid guide segment 140 along the Z-axis (i.e., in a lateral direction).

Figure 4C:
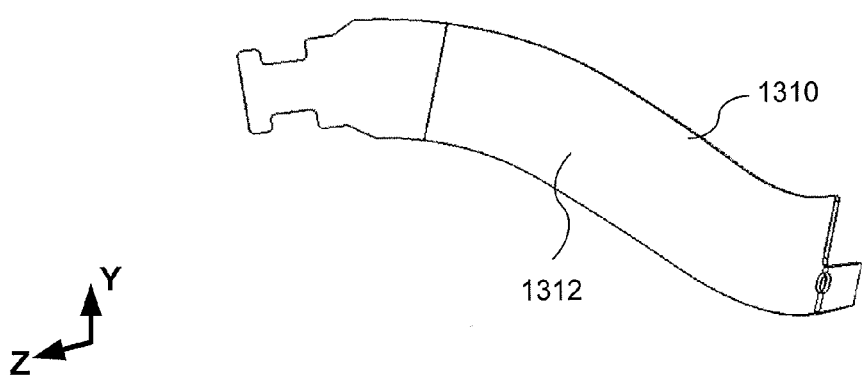
FIG. 4C is a side view of a semi-rigid segment of a strap system for a head-mounted display in accordance with some embodiments.

In some alternative embodiments, the strap system 100 comprises two separate and symmetric semi-rigid segments each including an arc portion. For example as shown in FIG. 4C, the semi-rigid segment 1310 (positioned near the left side of the user's head) includes one arc portion 1312 to extend from above a user's left ear to below the user's occipital lobe. The strap system 100 includes another symmetric semi-rigid segment (not shown) having one arc portion to extend from above the user's right ear to below the user's occipital lobe. The semi-rigid segment 1310 and the symmetric semi-rigid segment are attached to the rigid guide segment 140 and the rigid guide segment 120 respectively using any suitable method as discussed above. The semi-rigid segment 1310 and the symmetric semi-rigid segment are further attached to the rigid piece 160. The one or more semi-rigid segments of the strap system 100 provide a comfortable wearing experience and maintain balance between the front load from the head-mounted display and the back load of the rigid piece 160.

Figure 5A:
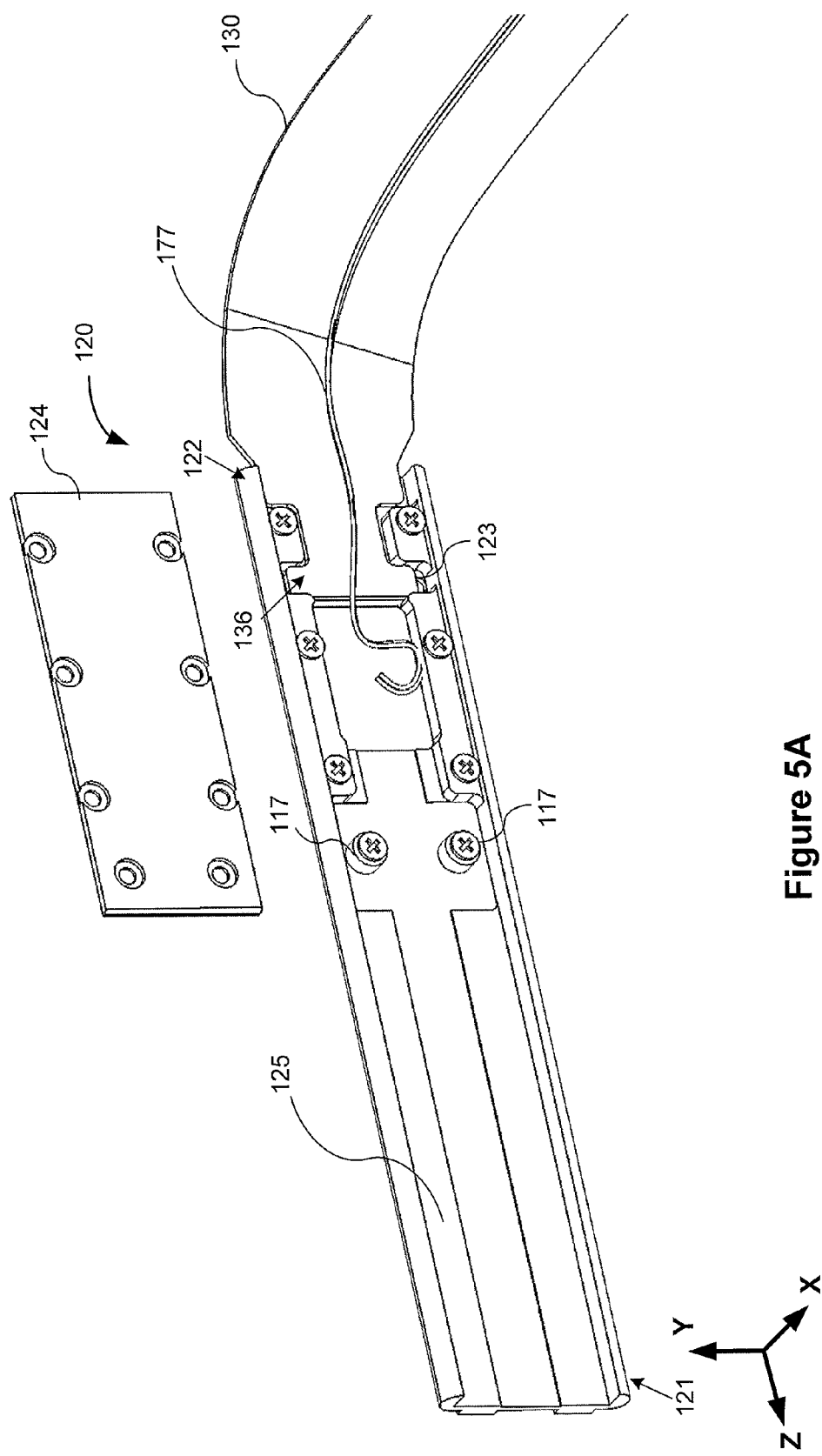
FIG. 5A is a perspective view of a rigid guide segment of a strap system for a head-mounted display in accordance with some embodiments.

FIG. 5A is a view of the rigid guide segment 120 of the strap system 100 in accordance with some embodiments. In some embodiments, the rigid guide segment 120 is located near the right side of the user's head. The rigid guide segment 120 includes a channel 125 for housing the flexible segment 110 to slide inside the channel 125. The channel 125 of the rigid guide segment 120 can house the stretchable band 115 of the flexible segment 110 to stretch along the lateral dimension (e.g., along the Z dimension). In some embodiments, the rigid guide segment 120 comprises a cover piece 124 to be screwed to the inside surface of the rigid guide segment 120. As shown in FIG. 5A, the screwing points 117 are further connected to the stretchable band 115. The grooves 123 match the protruding end 136 of the semi-rigid segment 130 for engaging the protruding end 136 in the grooves 123 to connect the rigid guide segment 120 with the semi-rigid segment 130. The rigid guide segment 120 may also house a portion of the electric cables 177 which extend along the semi-rigid segment 130 to provide power to the integrated audio headphones. In some embodiments, the rigid guide segment 120 is made of rigid plastic material, such as acrylonitrile butadiene styrene (ABS) plastic. In some embodiments, the rigid guide segment 140 positioned near the left side of the user's head comprises similar structures (e.g., channel, grooves, and/or screwing points) for connecting the rigid guide segment 140 with the semi-rigid segment 130 and the flexible segment 150.

Figure 5B:
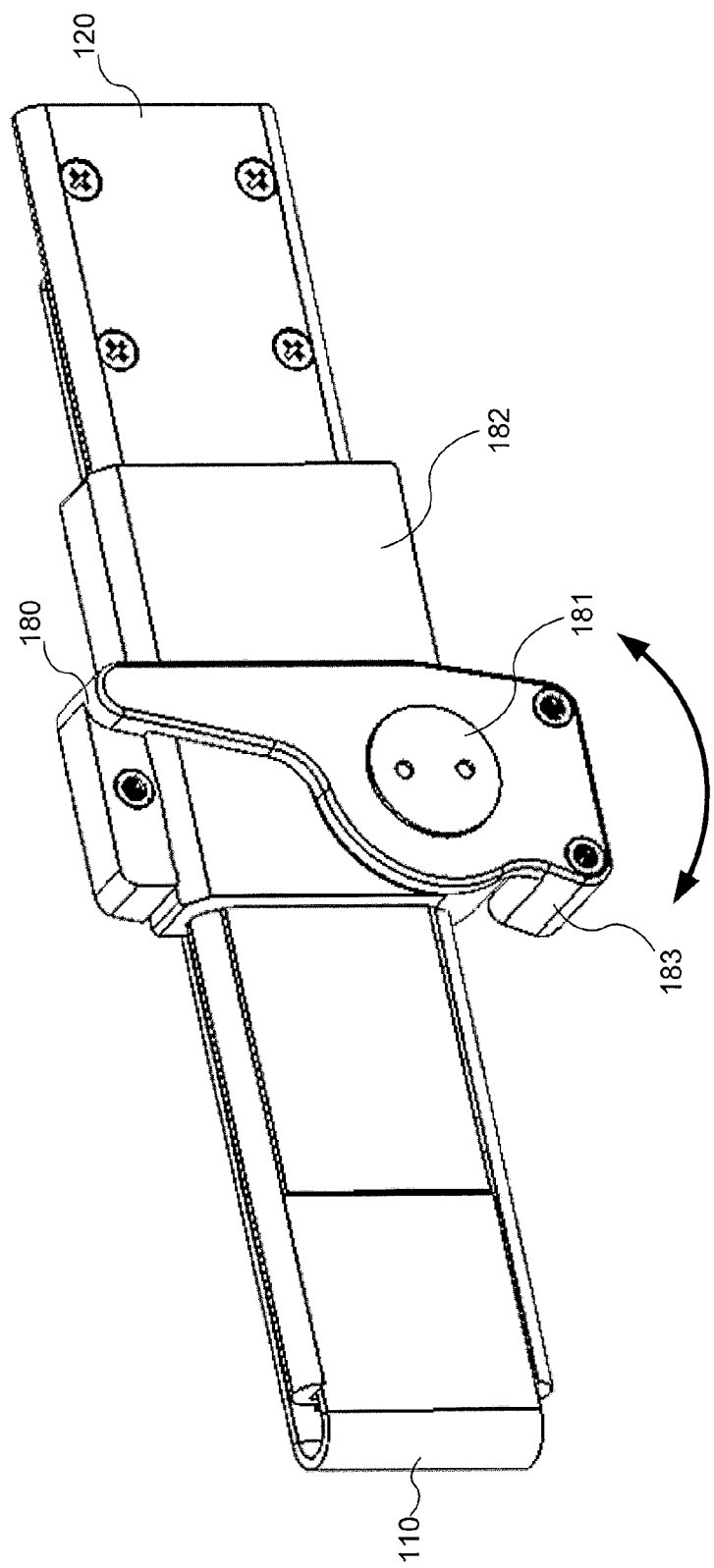
FIG. 5B is a perspective view of a mounting device attached to a rigid guide segment of a strap system for a head-mounted display in accordance with some embodiments.

FIG. 5B is a view of the mounting device 180 attached to the rigid guide segment 120 of the strap system 100. The mounting device 180 is further connectable to the head-mounted display for attaching the strap system 100 to the head-mounted display. In some embodiments, the mounting device 180 comprises a rotational pivot joint 181, and the mounting device 180 is rotatable relative to the rotational pivot joint 181 so as to provide rotation of the rigid guide segment 120 with respect to the head-mounted display. In some embodiments, the mounting device 180 comprises a component 182 attached to the rigid guide segment 120. For example, the component 182 is a mounting bracket to couple the rigid guide segment 120 to the mounting device 180. In some embodiments, the mounting device 180 also includes a component 183 (e.g., a mounting bracket) to attach the mounting device 180 to the head-mounted display. For example, the component 183 can be screwed to the inside of the head-mounted display housing.

In some embodiments, the rigid guide segment 120 can rotate relative to the pivot joint 181 in a range from about −20° to about +20° within the vertical plane (e.g., the Y-Z plane). In some embodiments, the rigid guide segment 120 is rotatable from about −10° to about +10° within the vertical plane. As shown in FIG. 1A, the strap system 100 may also include a mounting device 190 for attaching the rigid guide segment 140 to the head-mounted display. The design of the mounting device 190 is substantially similar to the mounting device 180, and the mounting device 190 permits rotation motion of the rigid guide segment 140 in a range (e.g., from about −20° to about +20° within the vertical plane, or from about −10° to about +10° within the vertical plane). The mounting devices allow certain amount of rotation of the rigid guide segments relative to the front head-mounted display so as to accommodate different users with different head and/or face geometries and wearing preferences.

Figure 6A:
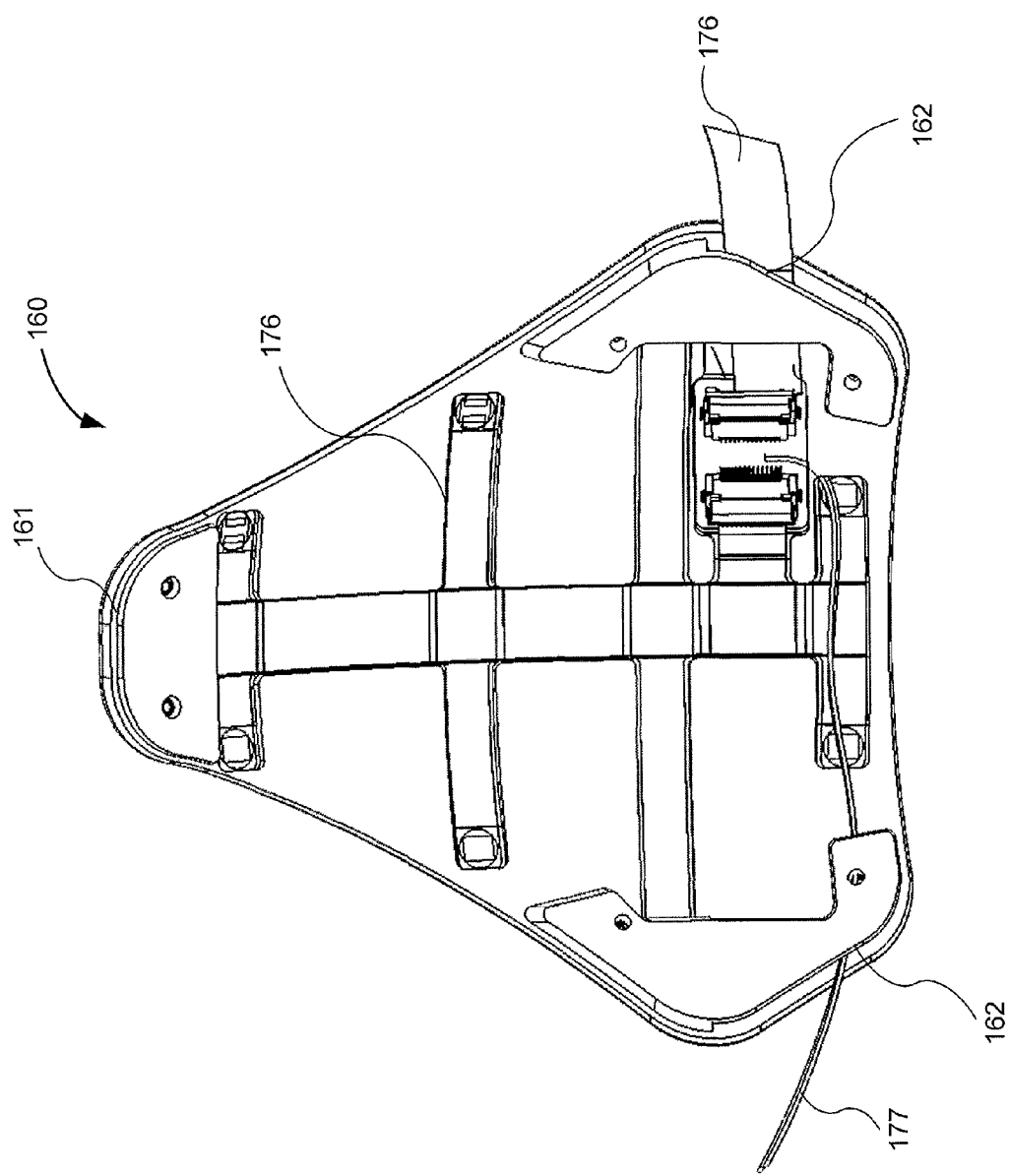
FIG. 6A is a front view of a back rigid piece of a strap system for a head-mounted display in accordance with some embodiments.

FIG. 6A is a front view (i.e., showing the side facing the user's head) of the rigid piece 160 of the strap system 100 in accordance with some embodiments. For example, the rigid piece 160 is made of rigid plastic material and has a triangular shape. In some embodiments, the rigid piece 160 is coupled to the top strap 170 by inserting the end 171 of the top strap 170 into a slot 161 and further screwing the end 171 to the rigid piece 160. The rigid piece 160 also includes slots 162 such that the one or more semi-rigid segments 130 can be inserted into the slots 162 and further screwed to be attached to the rigid piece 160.

Figure 6B:
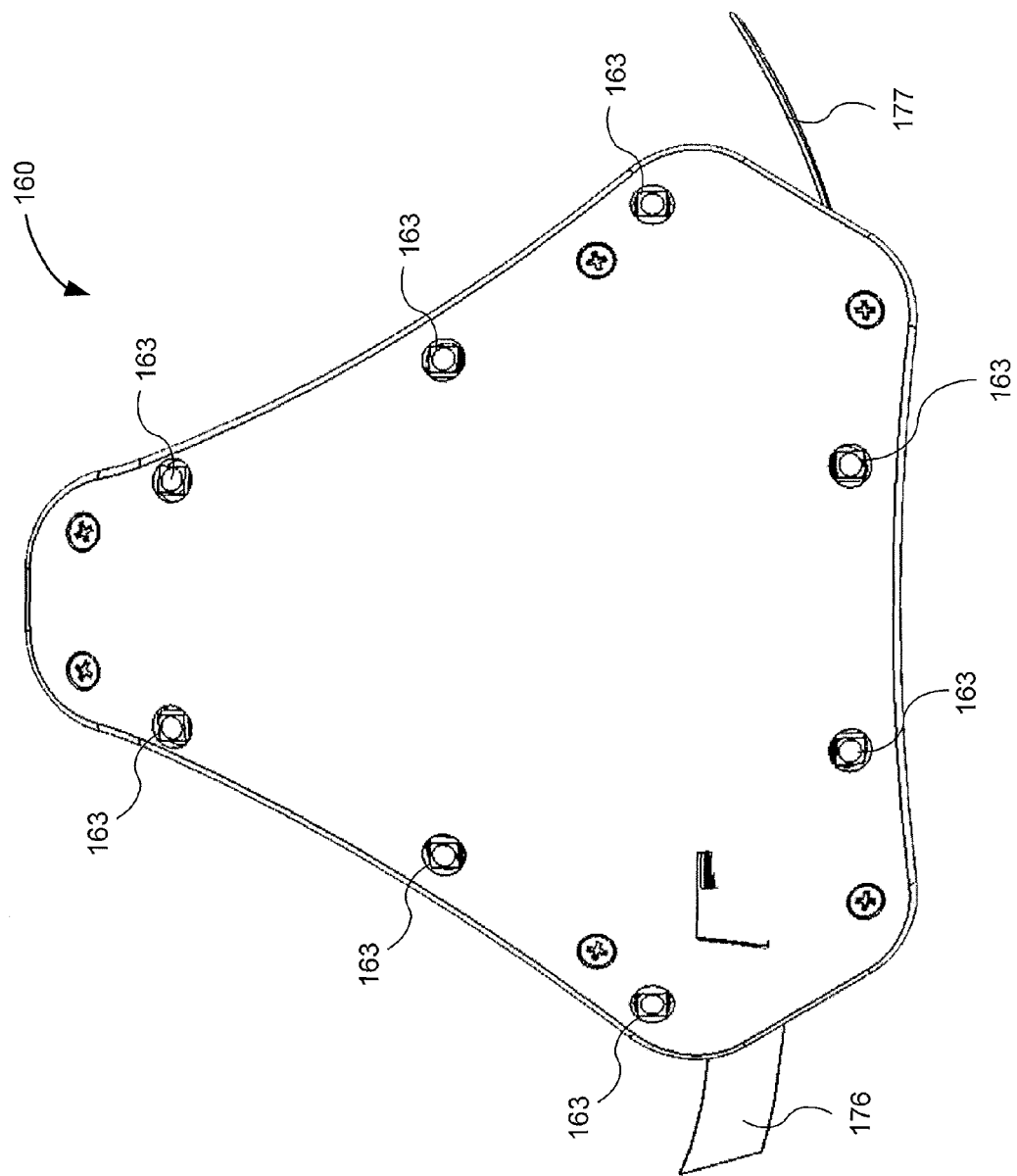
FIG. 6B is a back view of a back rigid piece of a strap system for a head-mounted display in accordance with some embodiments.

FIG. 6B is a back view (i.e., showing the side facing away from the user's head) of the rigid piece 160 of the strap system 100 in accordance with some embodiments. A plurality of Infrared (IR) LED lights 163 are coupled to the rigid piece 160 for tracking motions of the user's head. In some embodiments, the plurality of IR LED lights 163 are positioned on an outer surface of the rigid piece 160. In some embodiments, the plurality of IR LED lights 163 are molded into the rigid piece so that the IR LED lights are flush with the surface (yet the IR LED lights are still exposed). Alternatively, an IR transmissive material can be used on the rigid piece, e.g., on the surface of the rigid piece. The IR LED lights are positioned under the surface of the rigid piece and covered by the IR transmissive material, so that IR light can still be transmitted through the surface of the rigid piece. In some examples as shown in FIG. 6B, the IR LED lights 163 are distributed along the edges of the rigid piece 160. The IR LED lights can also be arranged in any other suitable patterns. The rigidity of the rigid piece 160 allows accurate positioning of the IR LED lights for head-motion tracking. These IR LED lights 163, when working with a motion tracking video camera and the related software, provide 360° head-motion tracking using the head-mounted display system.

As shown in FIGS. 1D, 2, 3 and 6A, the strap system 100 includes flat flexible circuits 176 and electric cables 177 extending along the rigid guide segment 120, the semi-rigid segment 130, the rigid piece 160, and the rigid guide segment 140, to provide power management and/or other functionalities to components of the strap system 100. In some embodiments, the flat circuits 176 are distributed on the inner surface of the rigid piece 160 as shown in FIG. 6A. The flat circuits 176 provide power and/or other functionalities to a plurality of IR LED lights 163 distributed on the outer surface of the rigid piece 160. The flat circuits 176 and the electric cables 177 pass through the slots 162 to extend along the semi-rigid segment 130 to provide power to the integrated audio headphones (not shown) and to connect to the head-mounted display. In some embodiments, the inner surface of the rigid piece 160 is covered using a suitable material, such as fabric or plastic, so that the flat circuits 176 and the electric cables 177 are not directly in contact with the user's head.

Figure 7A:
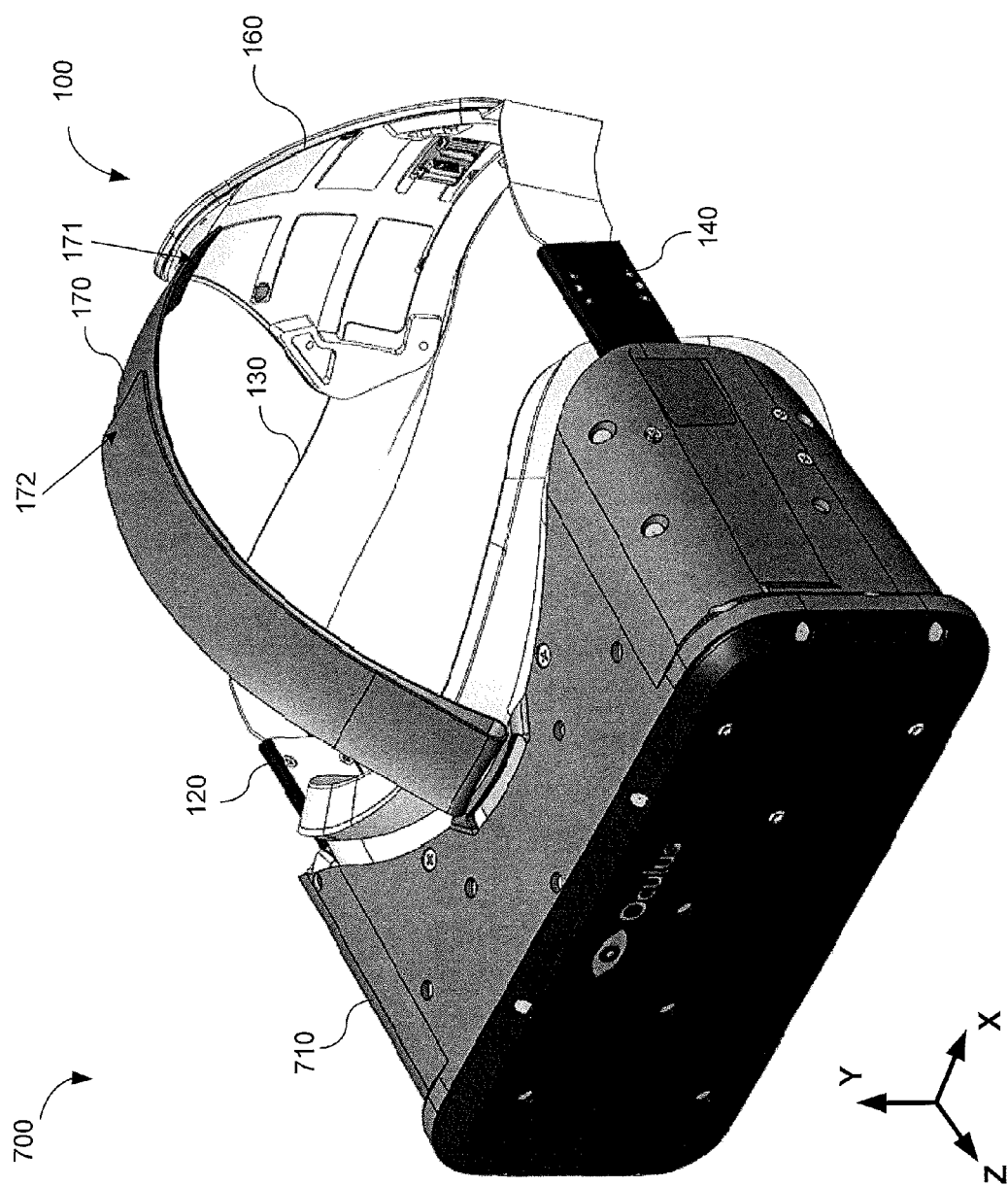
FIGS. 7A-7C are a perspective view, a side view, and a top view respectively of a head-mounted display system in accordance with some embodiments.
Figure 7B:
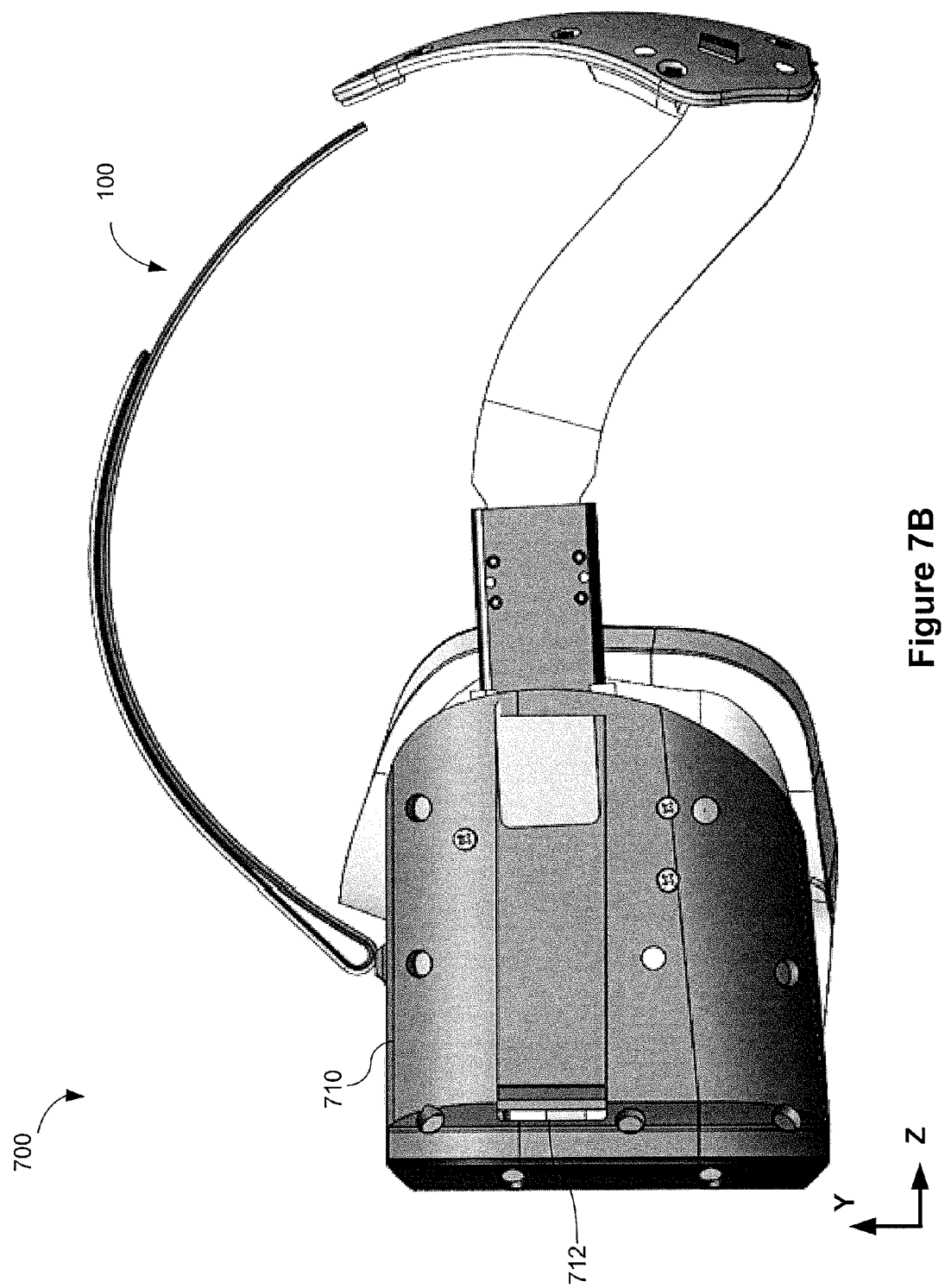
Figure 7C:
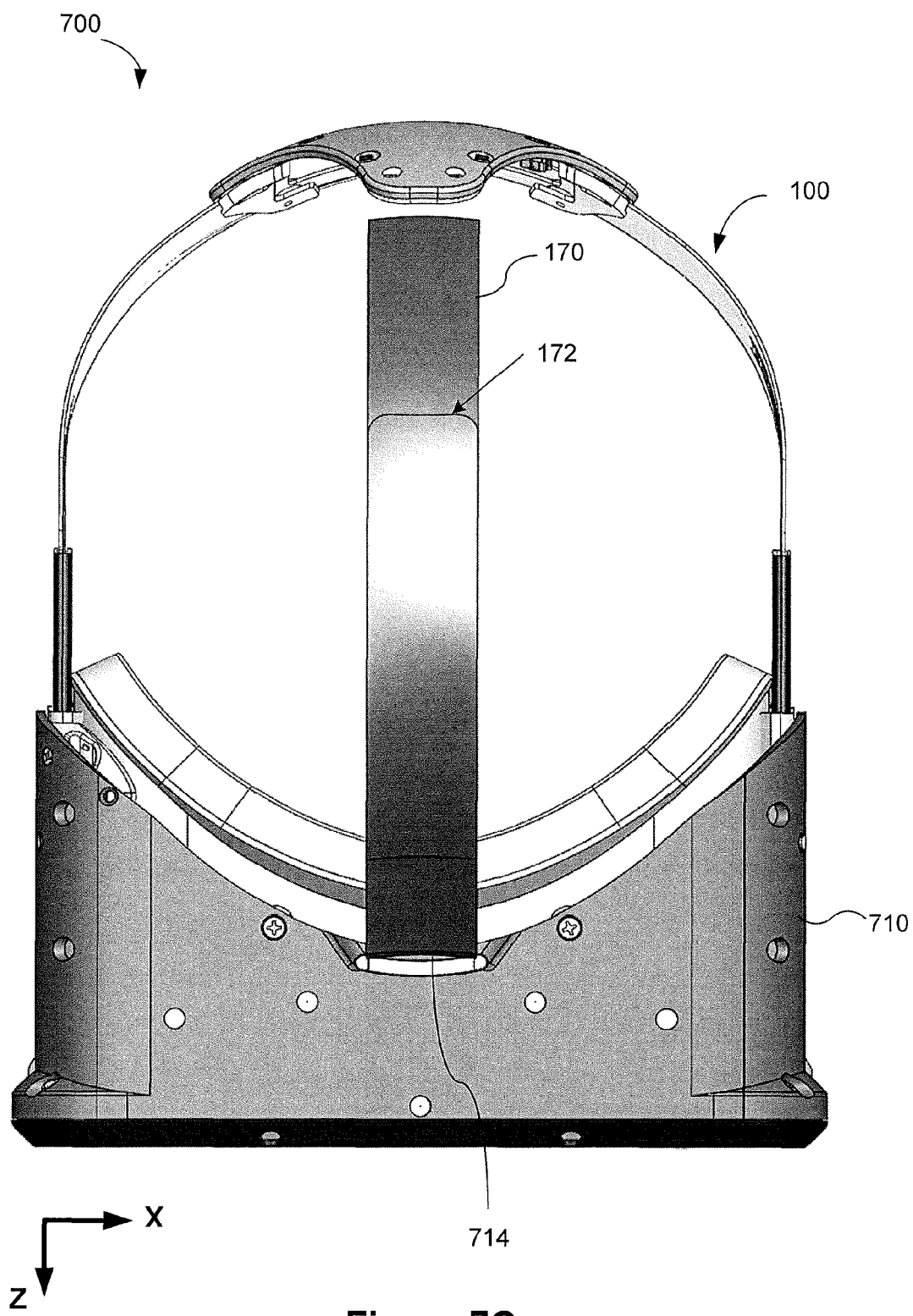

FIGS. 7A-7C are a perspective view, a side view, and a top view respectively of a head-mounted display system 700 in accordance with some embodiments. The head-mounted display system 700 comprises a head-mounted display 710 and the strap system 100 (as discussed with reference to FIGS. 1A-1D) coupled to the head-mounted display 710. As shown in FIG. 7A, the rigid guide segments 120 and 140 are coupled to the head-mounted display 710 using a mounting device (e.g., the mounting devices 180 and 190 as discussed with reference to FIGS. 2 and 5B). The head-mounted display system 700 further comprises the rigid piece 160 coupled to the semi-rigid segment 130 to rest against the back of the user's head. The head-mounted display system 700 also comprises the top strap 170 having the end 171 connected to the rigid piece 160 and the free end 172. In some embodiments in the head-mounted display system 700, the rigid guide segments 120 and 140 are rotatably connected to the head-mounted display 710, so that the rigid guide segments are rotatable relative to the head-mounted display 710 to provide compatibility with users' head and face geometries and wearing preferences.

As shown in FIG. 7B, after the strap system 100 is coupled with the head-mounted display 710, a free end of the non-stretchable band extends through a slit (e.g., a slit 712) on one side of the head-mounted display 710 and wraps back to lock the free end on the side of the head-mounted display 710 to adjustably fit the head-mounted display 710 on the user's head.

As shown in FIG. 7C, after the strap system 100 is coupled with the head-mounted display 710, the free end 172 of the top strap 170 extends through a slit (e.g., a slit 714) on the head-mounted display 710 and wraps back to lock the free end 172 of the top strap 170 using a suitable method to adjustably fit the head-mounted display 710 on the user's head.

FIG. 8 is a flowchart illustrating a method 800 for using the strap system 100 to mount a head-mounted display (e.g., the head-mounted display 710 of FIGS. 7A-7C) on a user's head in accordance with some embodiments. In some embodiments, a head-mounted display is positioned (802) on the user's head and in front of the user's eyes. The strap system 100 includes the rigid guide segments 120 and 140 as described above with regard to FIGS. 1A, 2 and 3. The rigid guide segments 120 and 140 are connected to the head-mounted display and positioned (802) along sides of the user's head and above the user's ears.

The strap system 100 further comprises the rigid piece 160 as described with regard to FIGS. 1 and 6A-6B. The rigid piece 160 is positioned (804) on the back of the user's head.

The semi-rigid arcs 130 of the strap system 100 extend (806) from the rigid guide segments 120 and 140 above the user's ears to portions of the rigid piece 160 below the user's occipital lobe.

The free end 113 of the flexible segment 110 and the free end 153 of the flexible segment 150 of the strap system 100 are extended (808) and adjustably locked (808) onto the head-mounted display to fit the head-mounted display on the user's head.

The flexible segment 110 comprises (810) a stretchable band 115. The flexible segment 150 comprises (810) the stretchable band 155. The stretchable bands 115 and 155 are respectively connected (810) to the rigid guide segments 120 and 140.

In some embodiments, a free end 172 of the top strap 170 of the strap system 100 is extended (812) through the head-mounted display. Another end 171 of the top strap 170 is connected (812) to the rigid piece 160 at the back of the user's head.

In some embodiments, the top strap 170 is adjusted (814) and locked (814) with respect to the head-mounted display to conform (814) to the top of the user's head from the rigid piece 160 to the head-mounted display.

As discussed above with respect to FIGS. 2-3, the stretchable bands of the flexible segments are stretchable within the respective rigid guide segments so as to adjust the strap system 100. Therefore, the stretchable bands in combination with the rigid guides allow the user to easily remove the head-mounted display without having to reset the strap lengths and/or positions every time.

The strap system 100 as discussed in the present disclosure can be used for mounting a head-mounted display on a user's head. The strap system 100 (e.g., the rigid guide segments and the back rigid piece) offers rigidity to balance the head-mounted display on the user's head and provide accurate head-motion tracking. The strap system 100 (e.g., the stretchable bands of the flexible segments and the semi-rigid segment) also provides adjustability to accommodate different users with different head sizes and shapes. In addition, the rigid guide segments of the strap system 100 are rotatable relative to the front head-mounted display to allow a better compatibility with users' head and face geometries and wearing preferences. The strap system comprises plastic materials, and thus is light-weight and comfortable to wear. When the user looks up and down or makes other head motions, the head-mounted display will not fall off the user's head. The strap system 100 further includes a plurality of IR LED lights distributed on the back rigid piece to allow 360° head-motion tracking (e.g., using an external camera to monitor the strap system 100).

Although some of various drawings illustrate a number of steps in a particular order, steps which are not order dependent may be reordered and other stages may be combined or broken out. Furthermore, some steps may be performed in parallel and/or simultaneously with one other. While some reordering or other groupings are specifically mentioned, others will be apparent to those of ordinary skill in the art, so the ordering and groupings presented herein are not an exhaustive list of alternatives.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A strap system for mounting a head-mounted display on a user's head, comprising:
   a first flexible segment comprising a first stretchable band;
   a first semi-rigid segment to conform to a portion of the user's head, comprising a first arc portion to extend from above a user's first ear to below the user's occipital lobe; and
   a first rigid guide segment connected to the first flexible segment and the first semi-rigid segment, wherein:
      the first flexible segment extends beyond a first end of the first rigid guide segment and the first semi-rigid segment extends from a second end of the first rigid guide segment, the first and second ends of the first rigid guide segment being opposite to each other in a lateral dimension, and
      the first flexible segment is stretchable within the first rigid guide segment along the lateral dimension so as to adjust the strap system in accordance with the user's head.

2. The strap system of claim 1, further comprising:
   a rigid piece, coupled to the first semi-rigid segment, to rest against the back of the user's head.

3. The strap system of claim 2, further comprising:
   a second flexible segment comprising a second stretchable band; and
   a second rigid guide segment connected to the second flexible segment, wherein:
      the second flexible segment extends beyond a first end of the second rigid guide segment, and
      the second flexible segment is stretchable within the second rigid segment along the lateral dimension so as to adjust the strap system in combination with the first flexible segment to fit the head-mounted display on the user's head.

4. The strap system of claim 3, wherein:
   the first semi-rigid segment further comprises a second arc portion to extend from above the user's second ear to below the user's occipital lobe,
   the second rigid guide segment is connected to the first semi-rigid segment, and
   a first end of the first semi-rigid segment extends from the second end of the first rigid guide segment, and a second end of the first semi-rigid segment extends from a second end of the second rigid guide segment, the first and second ends of the second rigid guide segment being opposite to each other in the lateral dimension.

5. The strap system of claim 3, wherein:
   the second rigid guide segment is connected to the first semi-rigid segment; and
   the first semi-rigid segment passes through grooves in the rigid piece.

6. The strap system of claim 3, further comprising a second semi-rigid segment comprising a second arc portion to extend from above a user's second ear to below the user's occipital lobe, the second semi-rigid segment being connected to the second rigid guide segment, wherein:
   the first semi-rigid segment extends from the second end of the first rigid guide segment to the rigid piece, and
   the second semi-rigid segment extends from a second end of the second rigid guide segment to the rigid piece, the first and second ends of the second rigid guide segment being opposite to each other in the lateral dimension.

7. The strap system of claim 2, further comprising a top strap having a first end connected to the rigid piece and a second end to adjustably fit the head-mounted display on the user's head, the top strap to conform to the top of the user's head from the rigid piece to the head-mounted display.

8. The strap system of claim 2, further comprising a plurality of Infrared (IR) LED lights coupled to the rigid piece for tracking motions of the user's head.

9. The strap system of claim 8, further comprising flat flexible circuits attached to the first semi-rigid segment and the rigid piece to provide power to the plurality of IR LED lights.

10. The strap system of claim 1, wherein:
the first flexible segment further comprises a first flexible non-stretchable band connected to the first stretchable band;
a first end of the first stretchable band is connected to the first rigid guide segment, and
the first flexible non-stretchable band has a first end connected to a second end of the first stretchable band, and a free second end to slide through the head-mounted display to adjustably fit the head-mounted display on the user's head.

11. The strap system of claim 10, wherein the first flexible non-stretchable band of the first flexible segment comprises bendable, non-elastic material.

12. The strap system of claim 1, further comprising a mounting device connected to the first rigid guide segment and connectable to the head-mounted display,
wherein the mounting device includes a rotation pivot point, the mounting device being rotatable relative to the rotation pivot point so as to provide rotation of the first rigid guide segment with respect to the head-mounted display.

13. The strap system of claim 1, wherein the first stretchable band of the first flexible segment comprises an elastic material.

14. The strap system of claim 1, wherein the first semi-rigid segment comprises a semi-rigid plastic material.

15. The strap system of claim 1, wherein:
the first rigid guide segment comprises rigid plastic material, and
the first rigid guide segment includes a channel within which to stretch the first stretchable band of the first flexible segment along the lateral dimension.

* * * * *